United States Patent [19]
Bens et al.

[11] 3,856,550
[45] Dec. 24, 1974

[54] FLUORESCENT VISUAL AUGMENTATION COMPOSITION

[75] Inventors: Everett M. Bens; Lloyd J. Holt, both of Ridgecrest, Calif.

[73] Assignee: The United States of America as represented by the Secretary of the Navy, Washington, D.C.

[22] Filed: Sept. 12, 1973

[21] Appl. No.: 396,650

Related U.S. Application Data

[63] Continuation-in-part of Ser. No. 56,941, July 21, 1970, abandoned.

[52] U.S. Cl. .................... 117/33.5 R, 8/8, 8/18, 117/100 BS, 117/120, 252/301.2 R, 252/301.3 R, 252/301.4 R
[51] Int. Cl. .................................................. C09k 1/02
[58] Field of Search ........ 117/33.5 R, 100 BS, 120; 252/301.3 R, 301.4 R, 301.2 R; 8/8, 18

[56] References Cited
UNITED STATES PATENTS

| | | | |
|---|---|---|---|
| 2,935,481 | 5/1960 | Hochwalt | 252/301.2 |
| 3,230,178 | 1/1966 | Bennahmias | 252/301.2 |
| 3,239,406 | 3/1966 | Coffman | 161/167 |
| 3,264,221 | 1/1966 | Winberg | 252/188.3 |
| 3,311,564 | 3/1967 | Cline | 252/188.3 |
| 3,361,677 | 1/1968 | Voedisch | 252/301.2 |
| 3,362,378 | 1/1968 | Bens | 116/124 |
| 3,518,205 | 6/1970 | Vukasovich | 252/301.2 |

*Primary Examiner*—William R. Trenor
*Attorney, Agent, or Firm*—R. S. Sciascia; Roy Miller; Lloyd E. K. Pohl

[57] ABSTRACT

Sized particles of inert carrier material are coated, by means of dry mixing, with smaller particles of daylight fluorescent pigment. The pigment particles adhere tightly to the carrier particles to form a material which is useful in producing signalling and marking clouds.

2 Claims, 1 Drawing Figure

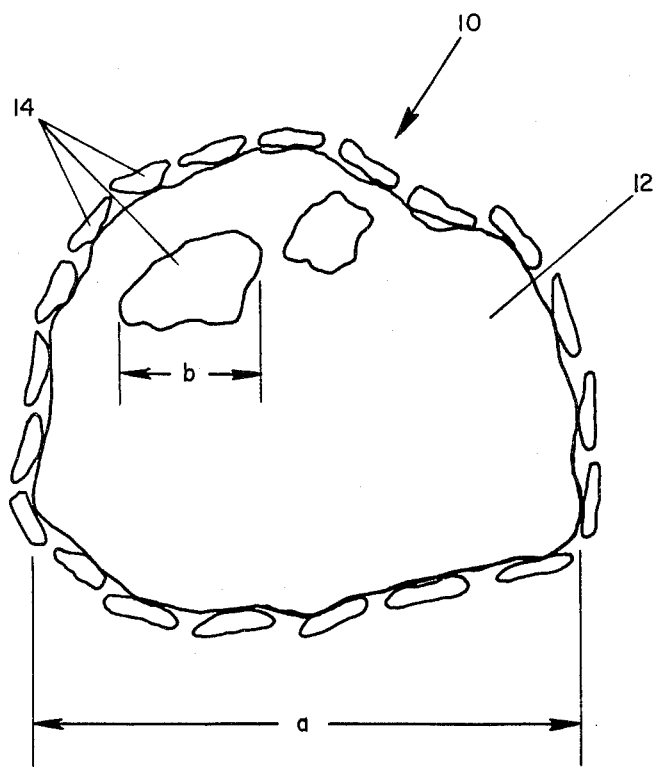

3,856,550

FLUORESCENT VISUAL AUGMENTATION COMPOSITION

CROSS-REFERENCE TO RELATED APPLICATION

This application is a continuation-in-part of applicant's prior copending application Ser. No. 56,941, filed July 21, 1970, and now abandoned.

BACKGROUND OF THE INVENTION

1. Field of the Invention.

This invention relates to materials for use in signalling or marking and their preparation. More particularly, this invention relates to materials which, when released from an aircraft or the like, will form a highly visible cloud and to the preparation of such materials.

2. Description of the Prior Art.

Daylight fluorescent pigments are well known. Daylight fluorescent pigments are defined in the *Encyclopedia of Chemical Technology*, Second Edition, Vol. 9, 1966, John Wiley and Sons, Inc., as those "which flouresce in response to radiation in both the ultraviolet and visible ranges." Daylight fluorescent pigments, because "the emitted light combines additively with the normal reflected color and tends to reinforce it," are more highly visible than non-daylight fluorescent pigments.

According to the *Encyclopedia of Chemical Technology*, the Dry Colors Manufacturers' Association lists four producers of daylight fluorescent pigments. They are (1) the Hercules Powder Company, Glen Falls, N.Y.; (2) Lawter Chemicals, Inc., Chicago, Ill.; (3) Radiant Color Company, Richmond, Cal.; and (4) Switzer Brothers, Inc., Cleveland, Ohio. Daylight flourescent pigments can be produced by either "coloring a resin in the fused state" or "dyeing a powdered resin or resin precipitate in a dyebath." For an example of coloring a fused resin, the *Encyclopedia of Chemical Technology* cites U.S. Pat. No. 2,498,592 to J. L. and R. C. Switzer. In that patent, a process is described wherein 0.2 part by weight of 4-amino-1,8-naphthal-2', 4'-dimethylphenylamide dye is added to 50 parts by weight of a 50 percent solution of butyl alcohol-modified urea-formaldehyde resin, the resin is polymerized by heating at 90°C until it gels, the gel is cut into small pieces and cured at 140°–145°C until it polymerizes to glasslike hardness and the glasslike pieces are pulverized in a ball mill or hammer mill. For an example of dyeing a powdered resin, the *Encyclopedia of Chemical Technology* cites British Pat. No. 770,889. The British patent discloses a method whereby 104 parts by weight of an aqueous dispersion of 20.7 percent polyacrylonitrile is acidified with 7 parts by weight of 99.5 percent glacial acetic acid and 0.125 parts by weight Rodamine 6G (Colour Index Basic Red 1); 0.25 parts by weight Rhodamine B (Colour Index Basic Violet 10); and 0.25 parts by weight Uranine (Colour Index Acid Yellow 73) are added. The mixture is then stirred for 2 hours at room temperature, filtered, washed and air dried. As still other examples of how to prepare daylight fluorescent resins, the *Encyclopedia of Chemical Technology* refers the reader to U.S. Pat. No. 2,809,954 (Kazeacs), U.S. Pat. No. 2,851,423 (Gaunt) and British Pat. No. 712,219 (Badische Anilin-u. Soda-Fabrik). In its bibliography, the *Encyclopedia of Chemical Technology* lists 60 books, articles, reviews and patents (U.S. and foreign) as basic to daylight fluorescent pigments and an additional 12 books, articles and reviews for supplemental reading on theory.

In forming daylight fluorescent pigments, the basic rhodamine dyes which flouresce are the most commonly used and, at the present time, sulfonamide resins are the most commonly used resins. However, other resins such as amino resins, melamine resins, modified glyceral phthalate, vinyl resins and infusible urea resins can be used.

Once prepared, daylight fluorescent pigments, in addition to having the common property of being fluorescent have the common property of being susceptible to grinding to very small sizes. That is, whether they are prepared by coloring a fused resin or by dyeing a powdered or precipitated resin, the resulting material can be ground into extremely small particles.

As in the case of daylight fluorescent pigments, materials such as talc, expanded mica, magnesia, silica gel, diatomaceous earth, bakelite, expanded vermiculite, alumina, silica and calcium silicate are well known. And, as in the case of daylight fluorescent pigments, these materials have certain properties in common. One common property is the fact that they are all solids which can be ground into small particles of approximately equal size. Another common property is the fact that the above materials are all rather low in density. That is, if they are released in the air they tend to settle slowly to the ground provided, of course, that they have been ground into small particles. Still another common property of the above materials is the fact the surfaces of their particles tend to roughness.

SUMMARY OF THE INVENTION

It has now been found that if dry inert carrier material particles having certain properties which are herein later described are shaken with dry daylight fluorescent pigment particles having certain properties which are also herein later described a plurality of pigment particles will tightly adhere to the surface of each carrier material particle forming what is essentially a composite article. A quantity of such composite articles, when released from an aircraft or the like, will form an excellent signal or marking cloud. This invention is advantageous in that extremely small pigment particles are used. That is, almost maximum advantage is taken of surface area.

In a second embodiment of this invention, composite articles of the type spoken of in the previous paragraph are treated with tetrakis (dimethylamino) ethylene. This treatment renders the composites visible during darkness (at night).

BRIEF DESCRIPTION OF THE DRAWING

The single FIGURE is a schematic representation of one composite particle according to this invention.

DESCRIPTION OF THE PREFERRED EMBODIMENTS

Going first to the drawings, the numeral 10 generally points out a composite article according to this invention. The composite article is made up of a roughly spherical carrier material particle 12 having a dimension ($a$) coated with a plurality of pigment particles 14 having dimensions roughly equal to ($b$). It should be realized that the drawing is only schematic and that in the actual case, the entire surface of carrier particle 12 is completely covered with particles 14 even to the extent of some overlapping of pigment particles. It should also be realized that the dimensions a and b and the ratio of a to b or b to a may vary somewhat within acceptable limits. The ratios of a to b and b to a are obvious from the preferred sizes of carrier and pigment particles discussed below.

No binder is used to bind pigment particles 14 to carrier particle 12. To prepare composite articles according to this invention one simply places a quantity of carrier particles in a container, adds a quantity of pigment particles and shakes the two materials together until all of the material in the container appears to have taken on the color of the pigment. For a more specific example, one can take a test tube, partially fill it with talc which is one suitable carrier and which appears essentially white or neutral colored, add (for example) orange daylight fluorescent pigment, cap or cork the test tube and shake the test tube manually until it appears visually that all of the material in the test tube is orange. Of course, shaking may be mechanically carried out as well as manually carried out and there are numerous machines available with which mechanical shaking can be carried out.

Insofar as the amount of pigment added is concerned, the weight percentage of pigment may vary within a considerable range. It has been found that if as little as 12.5 weight percent pigment is added to 87.5 weight percent carrier, complete coating is obtained. On the other hand as much as 50 weight percent pigment and as little as 50 weight percent carrier may be used.

Examination by means of a microscope reveals that coating is essentially complete once all the material in a container appears, to the naked eye, to be the color of the pigment. That is, once a container containing pigment and carrier particles has been shaken until the color of the pigment visually appears to have completely replaced that of the carrier, coating is complete.

Carrier particles used in the practice of this invention must meet at least two specifications. First, they must have densities which are low enough so that they will float slowly downward through air when released from an aircraft. Densities on the order of from about 5.0 g/cc downward have been found to be suitable with densities on the order of about 3.0 g/cc or less preferred. Second, they must have surfaces to which pigment platelets will adhere. Actual testing with specific carrier materials and specific pigments is the only way to determine whether the second specification is met by the carrier. That is, it is not known exactly what makes the pigment platelets cling tenaciously to the carrier particles. In some cases it may be electrostatic attraction. In other cases it may be friction forces. In still other cases it may be something similar to van der Waals forces or perhaps even gravitational forces.

In materials tested as carrier particles thus far a third specification, namely size, has been found to be critical. Tests have thus far indicated that a diameter in excess of about 30 mesh or smaller than about 300 mesh renders particles unsuitable as carriers. If the diameter of the carrier particles exceeds about 30 mesh, a signal cloud will descend through the air too quickly to be of value. On the other hand, coating with pigment platelets has been found to be extremely difficult or impossible to achieve if the diameters of the carrier particles are less than about 300 mesh. Whether or not the above size range holds for all possible carrier materials is not known. There may be some as yet untested carrier material which has a density and surface properties which would permit the use of either larger or smaller particles.

Specific materials tested and found suitable in density and surface attraction for pigment particles to date include talc, expanded mica, magnesia, silica gel, diatomaceous earth, bakelite, expanded vermiculite calcium silicate, alumina and silica. Any daylight fluorescent pigment will adhere to the surface of any of the above named carrier materials provided all specifications disclosed herein are met.

Insofar as the daylight fluorescent pigment particles are concerned, they need meet only one specification. They should be in about the 0.5 to 2.5 micron range insofar as their largest diameter is concerned. The reason for this is that if the diameters of the pigment particles are any larger, the density of the composite articles formed will become too great and the articles will not float slowly enough through the air when released to form a cloud.

When carrier particles are dry coated with daylight fluorescent pigment particles as described above, the resulting composite articles can be used to produce a smoke which is highly visible in daylight. For example, a test tube or the like containing a large number of the articles can simply be dumped into the air by any of a large number of ways, i.e., release from an aircraft, firing from a cannon, firing from a Very pistol, throwing, etc., and the slowly descending particles will form a cloud which is highly visible in daylight. To form a cloud which is visible at night as well as in the daylight, the composite articles can be treated with tetrakis (dimethylamino) ethylene.

The treatment involving tetrakis (dimethylamino) ethylene comprises:

a. adding from about 10 to about 30 weight percent tetrakis (dimethylamino) ethylene to from about 90 to about 70 weight percent carrier particles in a container in a glove box or the like from which oxygen has been removed and replaced with an inert gas such as nitrogen;

b. shaking the carrier particles and tetrakis (dimethylamino) ethylene together until the tetrakis (dimethylamino ethylene is adsorbed leaving dry particles in the container; and c. adding daylight fluorescent pigment particles and shaking until the color of the material in the container appears to be that of the pigment.

It will, of course, be realized that all steps of the process involving tetrakis (dimethylamino) ethylene must be carried out in the absence of oxygen and that the resulting articles must be stored in the absence of oxygen prior to use. There are many ways known to the art by which this can be done.

Regarding step (b) of the process involving tetrakis (dimethylamino) ethylene, the liquid tetrakis (dimethylamino) ethylene becomes completely adsorbed by the carrier particles leaving the particles dry. Therefore, the coating with pigment is a dry coating process as in the case where no tetrakis (dimethylamino) ethylene is used.

What is claimed is:

1. A method for preparing composite articles which, when released in the air in a large group, will form a highly visible cloud which descends slowly, said method comprising the steps of:

a. placing, in a container, a plurality of inert dry carrier particles selected from the group consisting of talc, expanded mica, magnesia, silica gel, diatomaceous earth, bakelite, expanded vermiculite, calcium silicate, alumina and silica, said particles having diameters such that the particles will pass through a screen of from 30 to 300 mesh;

b. adding a plurality of dry daylight fluorescent pigment particles having diameters in the range of from 0.5 to 2.5 microns to said container which contains said carrier particles, said daylight fluorescent pigment particles being added in the weight percentage range of from 12.5 weight percent pigment per 87.5 weight percent carrier particles to 50 weight percent pigment per 50 weight percent carrier particles; and said daylight fluorescent pigment particles being prepared by a method selected from that of coloring a resin in the fused state with a rhodamine dye and that of dyeing a powdered resin or resin precipitate in a dyebath with a rhodamine dye and then reducing the colored or dyed resin to particles having diameters in the range of from 0.5 to 2.5 microns; and c. mixing said carrier particles and said daylight fluorescent pigment particles together until a plurality of composite articles each made up of an inner carrier particle and a plurality of outer pigment particles coating the carrier particle and held thereto by means of electrostatic attraction, friction forces, van der Waals forces, gravitational forces or a combination thereof are formed and all of the material in said container appears visually to have taken on the color of said daylight fluorescent pigment particles.

2. A method according to claim 1 wherein the carrier material is treated with tetrakis (dimethylamino) ethylene prior to adding said pigment particles.

* * * * *